US011159778B2

(12) United States Patent
Ida et al.

(10) Patent No.: US 11,159,778 B2
(45) Date of Patent: Oct. 26, 2021

(54) IMAGING APPARATUS, METHOD OF PROCESSING IMAGE, AND STORAGE MEDIUM

(71) Applicant: CANON KABUSHIKI KAISHA, Tokyo (JP)

(72) Inventors: Yoshiaki Ida, Utsunomiya (JP); Chiaki Inoue, Utsunomiya (JP); Yuichi Kusumi, Shimotsuke (JP); Kiyokatsu Ikemoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/443,672

(22) Filed: Jun. 17, 2019

(65) Prior Publication Data
US 2020/0007851 A1 Jan. 2, 2020

(30) Foreign Application Priority Data
Jun. 29, 2018 (JP) .............................. JP2018-125527

(51) Int. Cl.
*H04N 13/254* (2018.01)
*H04N 13/207* (2018.01)

(52) U.S. Cl.
CPC ......... *H04N 13/254* (2018.05); *H04N 13/207* (2018.05)

(58) Field of Classification Search
CPC .. H04N 13/254; H04N 13/207; H04N 13/271; H04N 13/106; G06T 7/586

USPC .......................................................... 348/140
See application file for complete search history.

(56) References Cited

U.S. PATENT DOCUMENTS

| 2015/0092016 | A1  | 4/2015 | Chen   |              |
|--------------|-----|--------|--------|--------------|
| 2015/0163479 | A1* | 6/2015 | Inoue  | G06T 5/005   |
|              |     |        |        | 348/47       |
| 2016/0210754 | A1* | 7/2016 | Ida    | G06T 7/586   |
| 2017/0111572 | A1* | 4/2017 | Kusumi | H04N 5/2351  |
| 2017/0244876 | A1* | 8/2017 | Ida    | G01B 11/25   |

FOREIGN PATENT DOCUMENTS

| CN | 107026392 A | 8/2017 |
|----|-------------|--------|
| JP | 61-198015 A | 9/1986 |

* cited by examiner

*Primary Examiner* — On S Mung
(74) *Attorney, Agent, or Firm* — Canon U.S.A., Inc. IP Division

(57) ABSTRACT

An apparatus includes an imaging element for obtaining a plurality of parallax images by receiving a plurality of light flux that passes through different areas of a pupil of an optical system by different pixels, and a processor for performing image processing on an image that is obtained by using the imaging element. The processor includes a first obtaining unit that obtains first shape information based on a plurality of photometric stereo images that are shot by using the imaging element in light source conditions that include at least three different light source conditions, a second obtaining unit that obtains second shape information by using the plurality of parallax images, and a third obtaining unit that obtains third shape information by using the first shape information and the second shape information.

20 Claims, 11 Drawing Sheets

IMAGING APPARATUS, METHOD OF PROCESSING IMAGE, AND STORAGE MEDIUM

BACKGROUND OF THE INVENTION

Field of the Invention

The aspect of the embodiments relates to a method of processing an image in which shape information of an object can be calculated, and an imaging apparatus.

Description of the Related Art

When an object is imaged, image processing can be performed on the basis of a physical model after imaging in a manner in which the object is imaged such that shape information such as distance information and surface normal information can be obtained. For this reason, it is desired that a technique that enables precise shape information to be readily obtained is developed.

Japanese Patent Laid-Open No. 61-198015 discloses that the calculation speed of distance information can be increased in a manner in which a photometric stereo method, which is known as a method of obtaining the surface normal of an object directly, is used together with distance measurement of a stereo camera.

In the method disclosed in Japanese Patent Laid-Open No. 61-198015, an imaging area is divided into areas on the basis of surface normal information that is obtained by the photometric stereo method, the distance between the centers of gravity of the divided areas is obtained from parallax images by the stereo camera, and a relative distance in an object that is located in each area is obtained from the surface normal information that is obtained by the photometric stereo method.

With this method, however, plural optical systems are used to obtain the parallax images. Accordingly, an apparatus becomes complex, and the size thereof increases. In addition, it is difficult to calculate matching between the parallax images because of aberration and occlusion of the optical systems. Furthermore, it is necessary to provide calibration of each optical system of the stereo camera and a structure for a relationship between the optical systems.

SUMMARY OF THE INVENTION

The aspect of the embodiments provides an apparatus including an imaging element for obtaining a plurality of parallax images by receiving a plurality of light flux that passes through different areas of a pupil of an optical system by different pixels, and a processor for performing image processing on an image that is obtained by using the imaging element. The processor includes a first obtaining unit that obtains first shape information of an object based on a plurality of photometric stereo images that are shot by using the imaging element in light source conditions that include at least three different light source conditions, a second obtaining unit that obtains second shape information of the object by using the plurality of parallax images, and a third obtaining unit that obtains third shape information of the object by using the first shape information and the second shape information.

Further features of the disclosure will become apparent from the following description of exemplary embodiments with reference to the attached drawings.

DESCRIPTION OF THE EMBODIMENTS

An imaging apparatus that includes an image processor that performs image processing according to an embodiment of the disclosure will hereinafter be described with reference to the drawings.

The image processor of the imaging apparatus according to the present embodiment obtains precise shape information (third shape information) by using shape information (first shape information) that is obtained by a photometric stereo method and shape information (second shape information) that is obtained from parallax images. In the description of the present application, the shape information includes surface normal information of an object, absolute distance information about an absolute distance from a reference position such as the position of an optical system, and relative distance information about a relative distance in an object area.

Before description of the structure of the imaging apparatus according to the present embodiment, a method of calculating the surface normal information by the photometric stereo method and a method of calculating the distance information by using the parallax images will be described.

Figure 8:
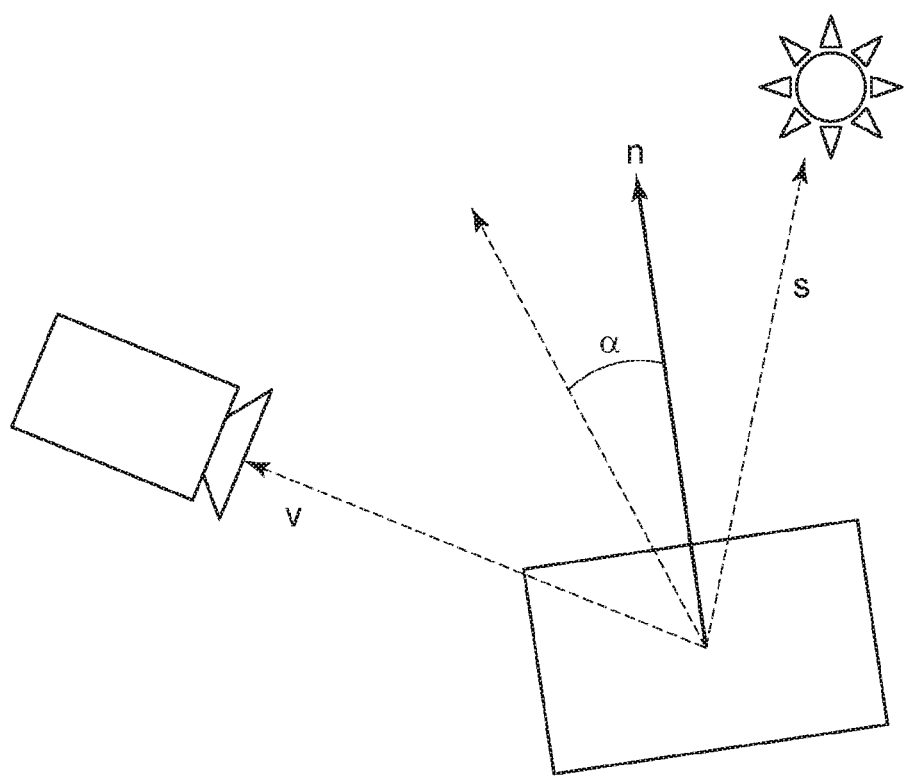
FIG. 8 illustrates a specular reflection component.

The photometric stereo method is a method of calculating surface-surface normal information from luminance information of the object at positions of light sources and reflection properties of the object that are presumed on the basis of the surface normal of the object and the direction (light source direction) from the object toward each light source. In the case where reflectance is not uniquely determined when a predetermined surface normal and the position of each light source are given, the reflection properties may be approximated by a Lambertian reflection model in accordance with Lamberts cosine law. As illustrated in FIG. 8, a specular reflection component depends on a bisector between a light source vector s and an eye vector v and an angle α of a surface normal n. Accordingly, the reflection properties may be based on an eye direction. The luminance information may be information from which an influence of a light source other than, for example, an ambient light source is removed in a manner in which an image of the object is shot when the light source is turned on and when the light source is turned off and a difference therebetween is calculated.

In the following description, the reflection properties are presumed by using the Lambertian reflection model. A luminance value i is expressed as the following expression (1) from the Lamberts cosine law, where i is the luminance value of reflected light, $\rho_d$ is Lambertian diffuse reflectance of an object, E is the intensity of incident light, s is a unit vector (vector in the light source direction) that represents the direction from the object toward the light source, and n is a unit surface normal vector of the object.

$$i = E\rho_d s \cdot n \tag{1}$$

The expression (1) is expressed as the following expression (2), where $s_1, s_2, \ldots, s_M$ are components of different light source vectors the number of which is M (M≥3), and $i_1, i_2, \ldots i_M$ are luminance values of the components of the light source vectors.

[Math. 1]

$$\begin{bmatrix} i_1 \\ \vdots \\ i_M \end{bmatrix} = \begin{bmatrix} s_1^T \\ \vdots \\ s_M^T \end{bmatrix} E\rho_d n \tag{2}$$

In the expression (2), the left side is a luminance vector in M rows and 1 column, $[s_1^T, \ldots, s_M^T]$ on the right side is an incident light matrix S that represents the light source direction in M rows and 3 columns, and n is a unit surface normal vector in 3 rows and 1 column. In the case of M=3, $E\rho_d n$ is expressed as the following expression (3) by using an inverse matrix $S^{-1}$ of the incident light matrix S.

[Math. 2]

$$E\rho_d n = S^{-1} \begin{bmatrix} i_1 \\ \vdots \\ i_M \end{bmatrix} \tag{3}$$

The norm of the vector of the left side in the expression (3) is the product of the intensity E of the incident light and the Lambertian diffuse reflectance $\rho_d$. A normalized vector is calculated as the surface normal vector of the object. That is, the intensity E of the incident light and the Lambertian diffuse reflectance $\rho_d$ appear in conditional expressions only in the form of product. For this reason, when $E\rho_d$ is regarded as a single variable, the expression (3) is regarded as a simultaneous equation to determine three unknown variables in addition to two degrees of freedom of the unit surface normal vector n. Accordingly, each variable can be determined by obtaining the luminance information by using at least three light sources. When the incident light matrix S is not a regular matrix, there is no inverse matrix, and the components $s_1$ to $s_3$ of the incident light matrix S is selected such that the incident light matrix S is a regular matrix. That is, the component $s_3$ is selected linearly independent from the components $s_1$ and $s_2$.

In the case of M>3, the number of the conditional expressions that are obtained is more than the number of the unknown variables to be obtained. Accordingly, the unit surface normal vector n is calculated in the same manner as in the case of M=3 from three conditional expressions that are freely selected. In the case where four or more conditional expressions are used, the incident light matrix S is not a regular matrix, and an approximate solution may be calculated by using, for example, a Moore-Penrose pseudo-inverse matrix. The unit surface normal vector n may be calculated by a fitting method or an optimization method.

In some cases where the reflection properties of the object are presumed by using a model that differs from the Lambertian reflection model, the conditional expressions are not linear expressions for the components of the unit surface normal vector n. In this case, obtaining the conditional expressions the number of which is equal to or more than the unknown variables enables the fitting method or the optimization method to be used.

In the case of M>3, the number of the conditional expressions that are obtained is no less than 3 and no more than M−1, and candidates for the solution of the unit surface normal vector n can be obtained. In this case, the solution may be selected from the candidates for the solution by using another condition. For example, continuity of the unit surface normal vector n can be used as the condition. When the surface normal vector n is calculated for every pixel of the imaging apparatus, the solution may be selected such that an evaluation function that is expressed as the following expression (4) is minimized, where n (x, y) is the surface normal vector of the pixel (x, y), and n (x−1, y) is known.

$$1 - n(x,y) \cdot n(x-1,y) \tag{4}$$

In the case where n (x+1, y) and n (x, y±1) are also known, the solution may be selected such that the following expression (5) is minimized.

$$4 - n(x,y) \cdot n(x-1,y) - n(x,y) \cdot n(x+1,y) - n(x,y) \cdot n(x,y-1) - n(x,y) \cdot n(x,y+1) \tag{5}$$

When there are no known surface normal and no surface normal is certain at positions of all of the pixels, the solution may be selected such that the sum total of the expression (5) in all of the pixels, which is expressed as the following expression (6), is minimized.

[Math. 3]

$$\sum_{x,y} \{4 - n(x, y) \cdot n(x-1, y) - n(x, y) \cdot n(x+1, y) - n(x, y) \cdot n(x, y-1) - n(x, y) \cdot n(x, y+1)\} \tag{6}$$

The surface normal of a pixel that is not the nearest pixel may be used. An evaluation function weighted depending on the distance from the position of the pixel to which attention is paid may be used.

Luminance information at the position of a freely selected light source may be used as another condition. In a diffuse reflection model that is represented by the Lambertian reflection model, the luminance of reflected light increases as the distance between the unit surface normal vector and the vector in the light source direction decreases. Accordingly, the unit surface normal vector can be determined by selecting the solution such that the solution is close to the vector in the light source direction when the luminance value is the maximum among luminance values in light source directions.

In a specular reflection model, the following expression (7) holds, where s is the light source vector and v is the unit vector (eye vector of the camera) in the direction from the object toward the camera.

$$s + v = 2(v \cdot n)n \tag{7}$$

As expressed in the expression (7), the unit surface normal vector n can be calculated when the light source vector s and the eye vector v of the camera are known. When the object has a rough surface, an exit angle increases even in specular reflection. In this case, specular reflection light spreads near the solution that is obtained in the case of a smooth surface, and a candidate that is closest to the solution in the case of the smooth surface may be selected from the candidates for the solution. The true solution may be determined by using the average of the candidates for the solution.

Figure 9:
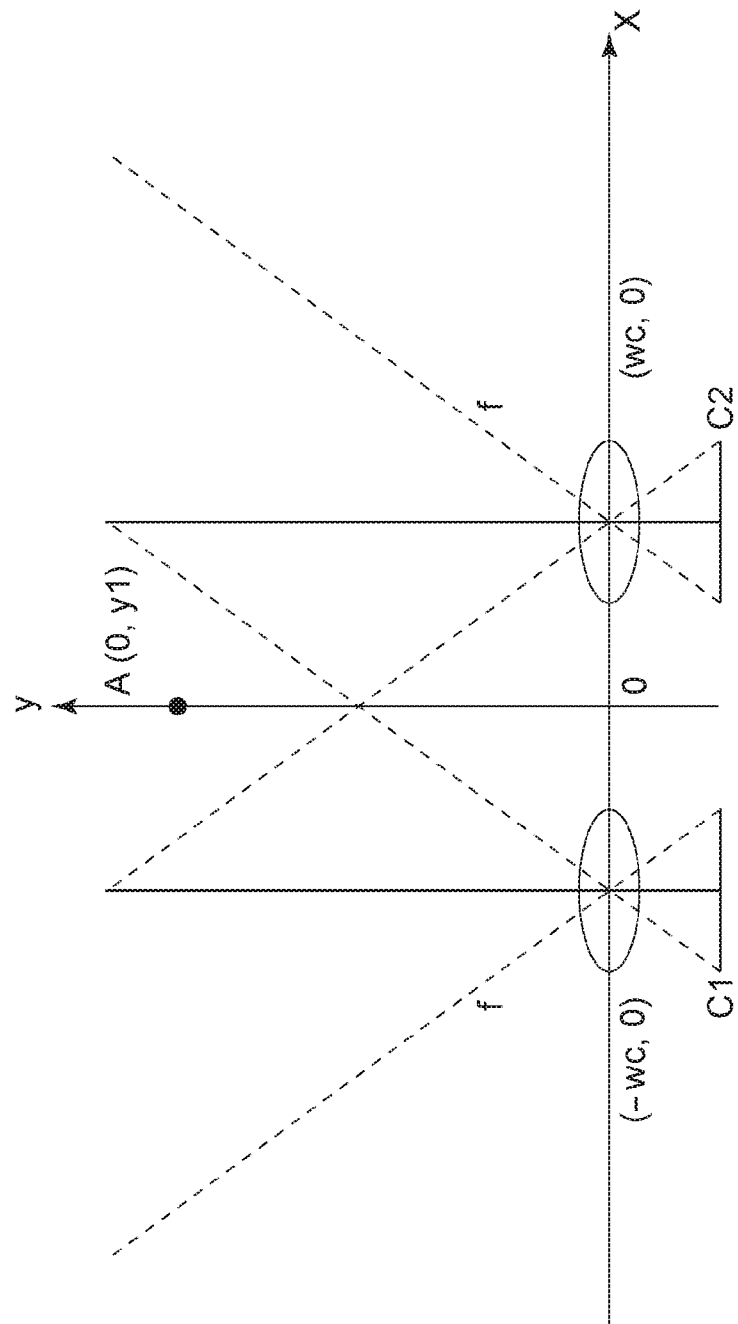
FIG. 9 illustrates a two-viewpoint shooting method.

The principle of distance calculation of the object by using the parallax images will now be described. FIG. 9 illustrates a model of a two-viewpoint shooting method. The origin of coordinates is the center of left and right cameras C1 and C2. The x-axis thereof extends in the horizontal direction. The y-axis thereof extends in the depth direction. The height direction is omitted for simplicity. The principal point of an image-forming optical system of the left camera C1 is located at (−Wc, 0). The principal point of an image-forming optical system of the right camera C2 is located at (Wc, 0). The focal length of each image-forming optical system of the left and right cameras is represented by f. It is considered that, in this state, images of an object A that is located at (0, y1) on the y-axis are shot by the cameras. Differences in position of the images of the object A from the center of sensors (imaging elements) of the left and right cameras are referred to as shooting parallax and are represented by Plc and Prc, which can be expressed as the following expressions.

[Math. 4]
$$Prc = \frac{wc}{y1} \cdot f \quad (8)$$

[Math. 5]
$$Plc = -\frac{wc}{y1} \cdot f \quad (9)$$

In accordance with the above principle, images of the same object are shot from different viewpoints, and left and right parallax images that have the differences expressed as the expressions (8) and (9) in viewpoint difference directions (directions parallel to a base line) can be obtained. A distance y1 to the object A can be calculated from the differences by using the following expression.

[Math. 6]
$$y1 = -\frac{2wc}{Prc - Plc} \cdot f \quad (10)$$

Accordingly, an object area that is related to the parallax images is specified to calculate the distance of the object by using the parallax images. Various method can be used to specify the same object area for the images. For example, a block matching method, in which one of the parallax images is used as a reference image, may be used.

The parallax images can be obtained by using an imager that guides a plurality of light flux that has passed through different areas of a pupil of a single imaging optical system to different light-receiving units (pixels) of a single imaging element for photoelectric conversion. That is, the single imager (including a single optical system and a single imaging element) can obtain the parallax images that are needed for distance calculation.

Figure 10:
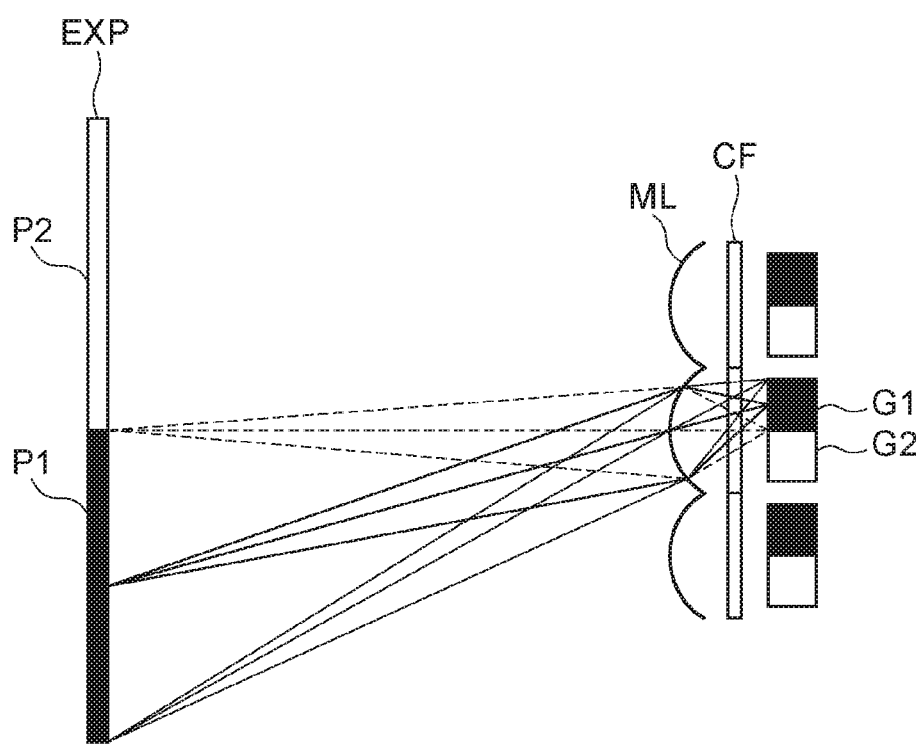
FIG. 10 illustrates a relationship between light-receiving units of an imaging element and a pupil of an imaging optical system according to the embodiment.

FIG. 10 illustrates a relationship between the light-receiving units of the imaging element and the pupil of the imaging optical system in the imager. Micro lenses are represented by ML. A color filter is represented by CF. An exit pupil of the imaging optical system is represented by EXP. The light-receiving units (referred to below as G1 pixels and G2 pixels) are represented by G1 and G2. A single G1 pixel and a single G2 pixel are paired with each other. Pairs of the G1 pixel and the G2 pixel (pixel pairs) are arranged in the imaging element. The pairs of the G1 pixel and the G2 pixel have a conjugate relationship with the exit pupil EXP with the common micro lens ML (disposed for every pixel pair) interposed therebetween. The G1 pixels that are arranged in the imaging element are referred to as a G1 pixel group. Similarly, the G2 pixels that are arranged in the imaging element are referred to as a G2 pixel group.

Figure 11:
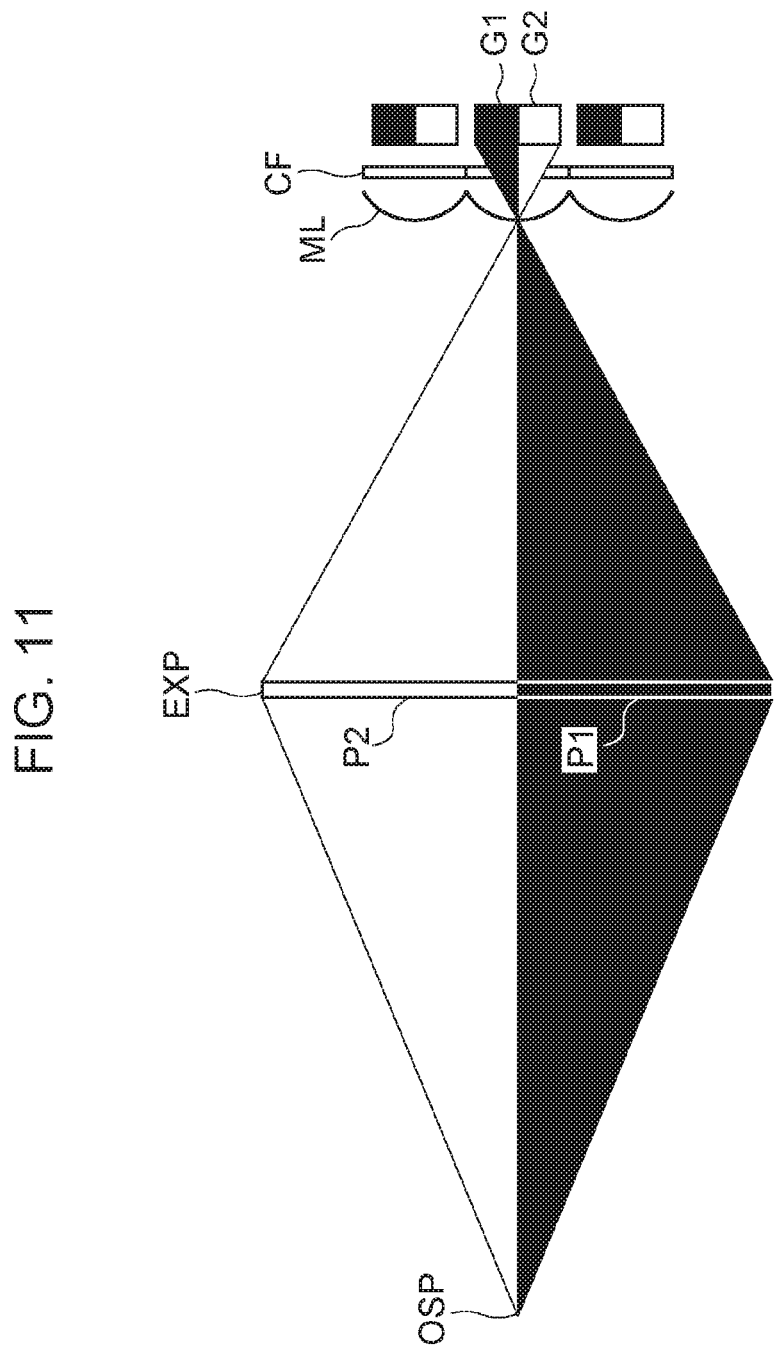
FIG. 11 illustrates a relationship between the light-receiving units of the imaging element and an object according to the embodiment.

FIG. 11 schematically illustrates the imager that is presumed to include a thin lens at the position of the exit pupil EXP in FIG. 10. One of the G1 pixels receives light flux that has passed through a P1 area of the exit pupil EXP. One of the G2 pixels receives light flux that has passed through a P2 area of the exit pupil EXP. An object point that is shot is represented by OSP. The object is not necessarily located at the object point OSP. The light flux that has passed through this point is incident on the G1 pixel or the G2 pixel depending on areas (positions) in the pupil through which the light flux passes. That the light flux passes through different areas in the pupil means incident light form the object point OSP is divided at angles (parallax). That is, an image that is generated by using an output signal from the G1 pixel and an image that is generated by using an output signal from the G2 pixel among the G1 and G2 pixels that are arranged against the respective micro lenses ML are the parallax images (a pair) that have parallax. In the above description, reception of the light flux that has passed through different areas in the pupil by the different light-receiving units (pixels) is referred to as pupil division. In the structures illustrated in FIG. 10 and FIG. 11, an image that is obtained by adding the G1 and G2 pixels and an image that is obtained by using the G1 pixel or the G2 pixel also have parallax. Accordingly, the image that is obtained by adding the G1 and G2 pixels can be one of the parallax images.

In FIG. 10 and FIG. 11, in some cases, the above conjugate relationship becomes imperfect or the P1 area and the P2 area partly overlap, for example, when the exit pupil EXP shifts. Also, in this case, the obtained images can be dealt with as the parallax images.

The distance information is calculated from the parallax images by the above method. This enables the single imager to calculate the distance by extracting a pixel that is related to the parallax images.

The imaging apparatus according to the present embodiment will now be described. The image processor of the imaging apparatus according to the present embodiment obtains the shape information with high precision by using the surface normal information as shape information that is obtained by the photometric stereo method and the distance information as shape information that is obtained from the parallax images.

Figure 1:
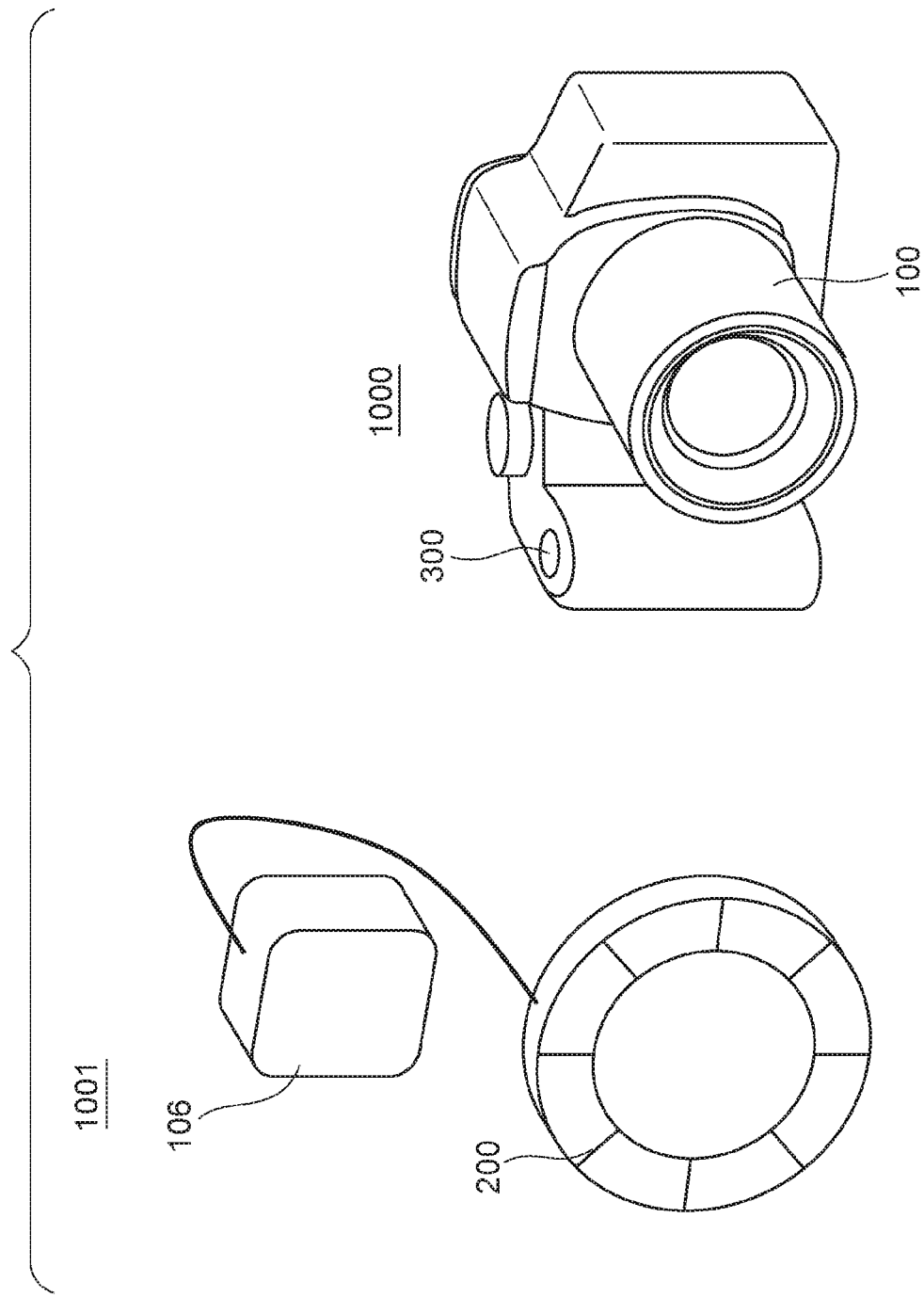
FIG. 1 illustrates an imaging apparatus according to an embodiment.
Figure 2:
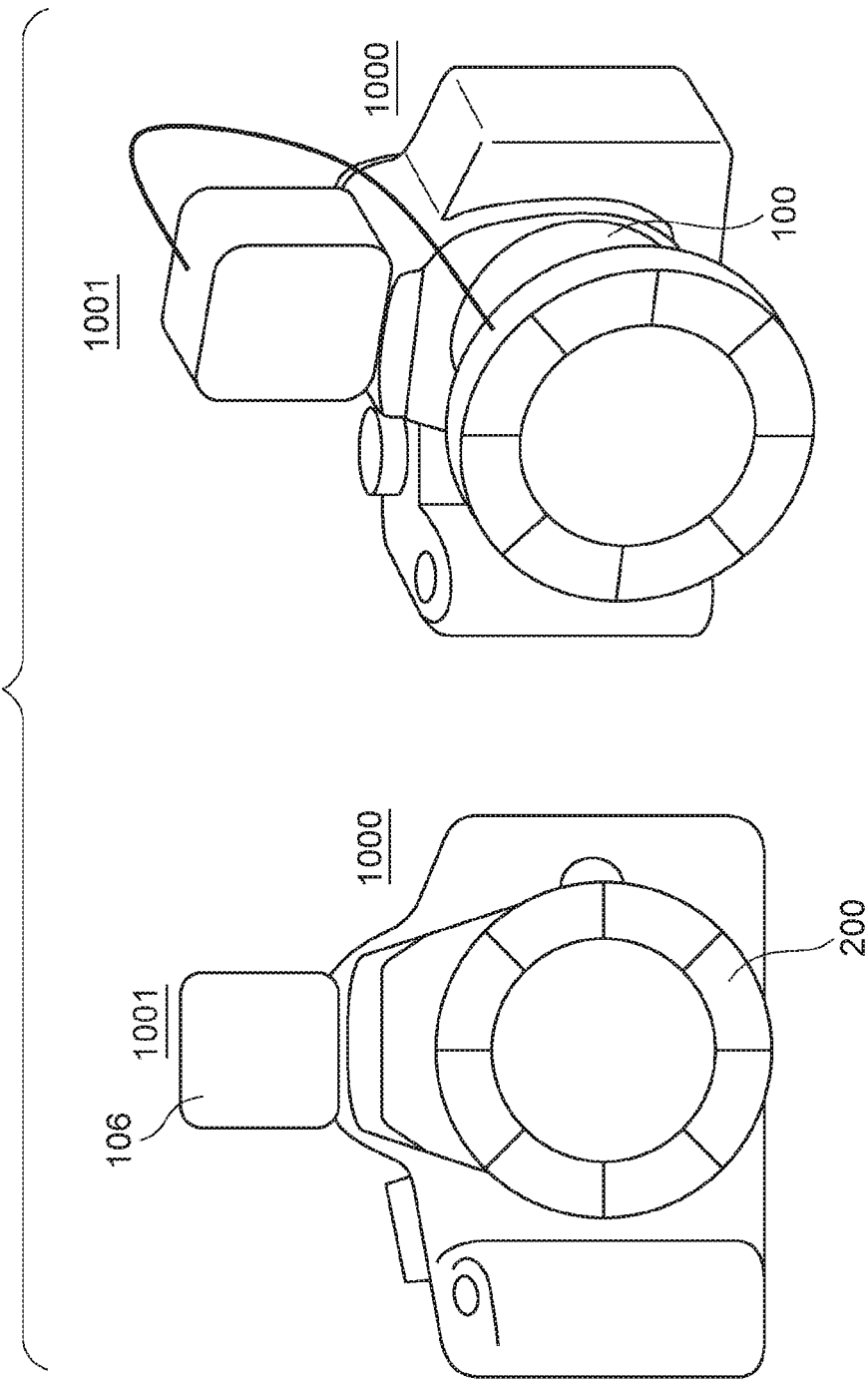
FIG. 2 illustrates the imaging apparatus according to the embodiment.

FIG. 1 illustrates an imaging apparatus 1000 and an illumination device 1001 according to the present embodiment. The illumination device 1001 includes a light emitter 200 and an emission light source control unit 106 and can be installed in and removed from the imaging apparatus that includes an imager 100. FIG. 2 illustrates the imaging apparatus 1000 that serves as a digital camera in which the illumination device 1001 is installed.

Figure 3:
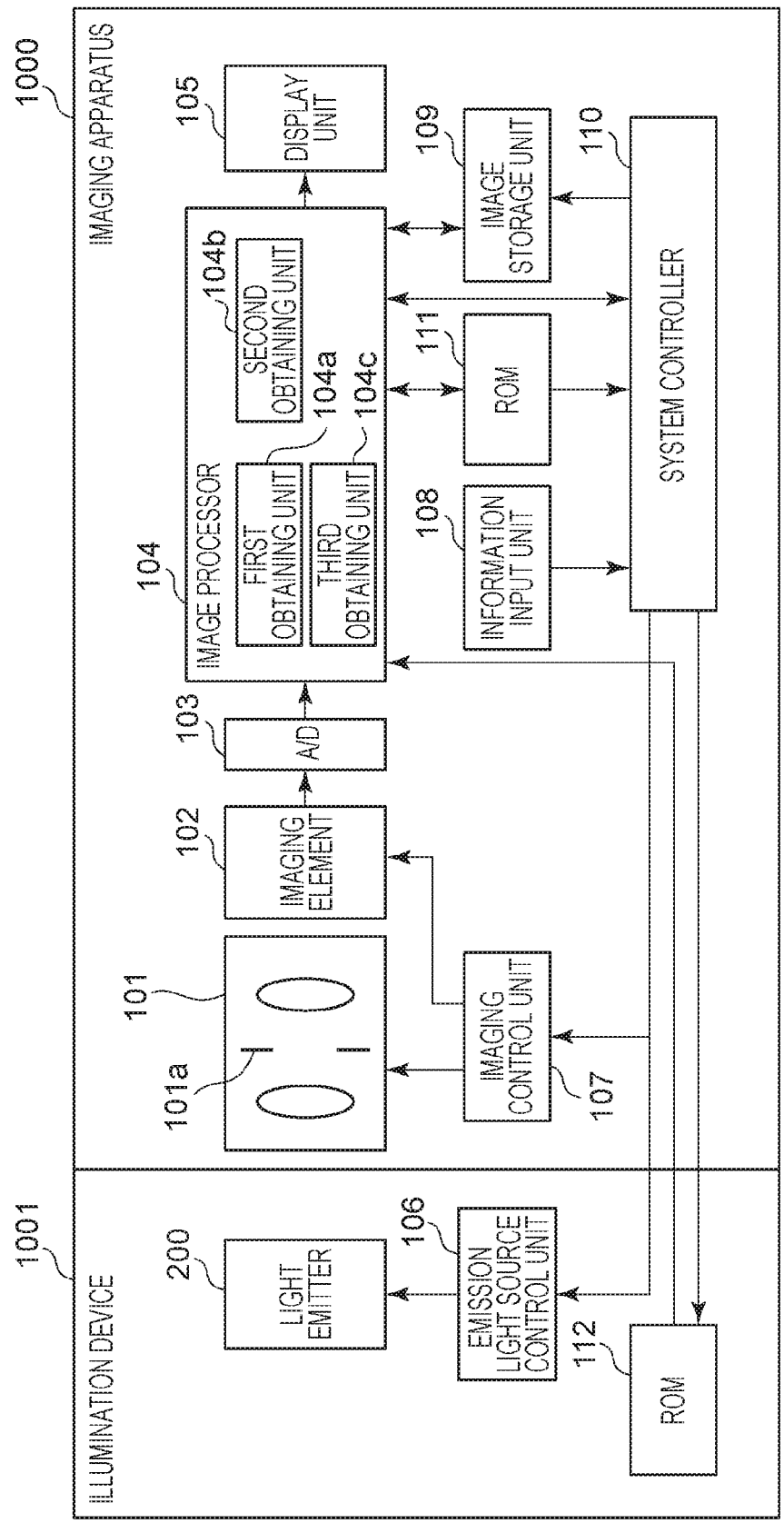
FIG. 3 is a block diagram of the imaging apparatus according to the embodiment.

FIG. 3 is a block diagram of the imaging apparatus 1000 according to the present embodiment.

The imaging apparatus 1000 includes the imager that images an object and the light emitter (light sources) 200. The imager includes an imaging optical system 101 and an imaging element 102.

According to the present embodiment, the light emitter 200 includes eight light sources that are concentrically arranged in a rotationally symmetric manner about the optical axis of the imaging optical system 101. The light emitter 200 can irradiate the object with light in light sources conditions by a combination of turning-on (light emission) and turning-off of the light sources. The number of the light sources that are used for carrying out the photometric stereo method is at least three, and the light emitter 200 includes three or more light sources. According to the present embodiment, the light sources of the light emitter 200 are concentrically arranged in a rotationally symmetric manner about the optical axis of the imaging optical system 101. However, the light sources are not necessarily arranged at regular intervals but may be arranged at irregular intervals. According to the present embodiment, the light emitter 200 can be installed in and removed from the imaging apparatus 1000 but may be built in.

The imaging optical system 101 includes lenses and a stop 101a and condenses light that is emitted from the object on the imaging element 102. According to the present embodiment, the imaging optical system 101 is removably installed as an interchangeable lens in the imaging apparatus 1000 but may be integrally formed with the imaging apparatus 1000. The imaging element 102 includes a photoelectric conversion element such as a CCD sensor or a CMOS sensor. The overall structure of the imager 100 is illustrated in FIG. 10 and FIG. 11. The imager 100 can obtain images from different viewpoints. That is, the plurality of light flux that has passed through different area of the pupil of the imaging optical system 101 is guided to different light-receiving units (pixels) of the imaging element 102 for photoelectric conversion.

An analog electrical signal that is generated by photoelectric conversion of the imaging element 102 is converted into a digital signal by an A/D converter 103 and inputted into an image processor 104.

The image processor 104 has a function of image processing that is typically performed on a digital signal and a function of obtaining the surface normal information and the distance information as the shape information of the object. The surface normal information is information for determining at least one or more candidates of one degree of freedom for the surface normal, information for selecting the true solution from the candidates for the surface normal, and information about validity of the obtained surface normal. The distance information is information about the depth of the object based on a predetermined position and represents the distance from a reference position such as a focal plane or a predetermined position in the imager. In particular, when the reference position is the focal plane, the information is defocus information of the object. For the imager 100, which guides the plurality of light flux that has passed through different areas of the pupil of the imaging optical system 101 to the different light-receiving units of the imaging element 102, a reference of a parallax difference (difference in a positional relationship of the object due to the parallax) is the focal plane, and the parallax difference and the defocus information correspond to each other.

A specific structure of the image processor 104 will be described. The image processor 104 includes a first obtaining unit (surface normal information-obtaining unit) 104a that obtains the surface normal information (first shape information) of the object from photometric stereo images by the photometric stereo method. The photometric stereo images are obtained by using different turning-on patterns of the light emitter 200. According to the present embodiment, the photometric stereo images are shot in light sources conditions that include at least three different turning-on patterns (light source conditions).

The image processor 104 also includes a second obtaining unit (distance-information-obtaining unit) 104b that obtains the distance information (second shape information) from the parallax images. The image processor 104 also includes a third obtaining unit 104c that obtains third shape information from the surface normal information and the distance information.

An output image that is processed by the image processor 104 is saved in an image storage unit 109 such as a semiconductor memory or an optical disk. The output image may be displayed on a display unit 105.

An information input unit 108 supplies imaging conditions (such as a stop value, an exposure time, and the focal length) that are selected by a user to a system controller 110.

The emission light source control unit 106 controls a state of light emission of the light emitter 200 in response to an instruction that is outputted from the system controller 110.

An imaging control unit 107 obtains an image in desired shooting conditions that are selected by the user on the basis of information that is outputted from the system controller 110.

A ROM 111 stores various programs that are performed by the system controller 110 and data that is needed for the programs.

A ROM 112 that is built in the illumination device stores a table in which properties such as light distribution properties of the light emitter and the amount of emitted light of the light emitter are included. The stored information may be transmitted to the image processor 104 as needed, and the first obtaining unit 104a may use the information to obtain the first shape information.

According to the present embodiment, the image processor 104 obtains the shape information (third shape information) of the object by using the surface normal information that is obtained by the photometric stereo method and the distance information that is obtained from the parallax images as described above. This enables the shape information (third shape information) of the object to be obtained with high precision.

For example, the distance information can be obtained by integrating the surface normal information that is obtained by the photometric stereo method. However, the precision of absolute distance is less than that of the distance information that can be obtained from the parallax images because of error during integrating. In the case where the distance varies along an edge of the object as in the case of a foreground and a background, the distance information as the shape information cannot be obtained from the surface normal information.

However, the use of the distance information that is calculated from the parallax images enables a systematic error due to integration to be removed and the absolute distance along the edge of the object to be reflected to the shape information. In the photometric stereo method, the precision of the surface normal information decreases when presumed reflection properties differ from the actual reflection properties of the object. However, the distance information that is obtained from the parallax images is not affected by the reflection properties. The surface normal information from the photometric stereo images is susceptible to small variation in distance more than the distance information from the parallax images, and resolution in the horizontal and vertical directions is more readily improved.

In the case of distance calculation from the parallax images, it is difficult to calculate the distance information in a low-contrast image area. However, the calculation can be readily carried out by the photometric stereo method.

Accordingly, an advantageous combination of the surface normal information by the photometric stereo method and the distance information from the parallax images enables precise third shape information to be obtained. The third shape information may be the distance information or the surface normal information.

According to the present embodiment, the image processor 104 obtains the parallax images and the photometric stereo images that are obtained by the single imager 100. For this reason, it is not necessary to use plural imagers or plural imaging apparatuses, and the images that are needed to obtain the shape information of the object can be obtained. Accordingly, the structure of the imaging apparatus that images the images that are needed to obtain the shape information can be simple.

In addition, since the distance information is calculated from the parallax images that are obtained by the single imager, influence of the difference due to distortion aberration and eccentricity can be reduced. In addition, influence of another optical aberration can be reduced, and a distance calculation process along the boundary between the foreground and the background can be inhibited from being affected by the parallax difference of the optical system. For example, an example of the effect on the distance calculation process along the boundary between the foreground and the background is that occlusion makes it difficult to extract a corresponding area.

In addition, since the photometric stereo images and the parallax images are obtained by the single imager, influence of the optical aberration and influence of the parallax difference in the shape information can be reduced also when the third shape information is obtained, and the third shape information can be obtained with precision. The influence of the parallax difference between the first shape information and the second shape information differs from the influence of the parallax difference between the parallax images because the shape information is based on data that is obtained by different principles. For example, in the case of images such as the parallax images, color information and luminance information about the foreground are common even along the boundary between the foreground and the background. However, the surface normal information and the distance information are not common, and it is difficult to determine a common foreground portion from the surface normal information and the distance information. Accordingly, it is difficult to reduce the influence of the parallax difference from the surface normal information and the distance information.

The surface normal information may be converted into the distance information by integration to obtain the first shape information. In this case, however, precise distance information cannot be obtained from the first shape information as above, and it is difficult to find similarity to the second shape information. Accordingly, it is important to reduce the parallax difference between the shot images from which the shape information is obtained in order to obtain the third shape information on the basis of the first shape information and the second shape information with precision.

Figure 4:
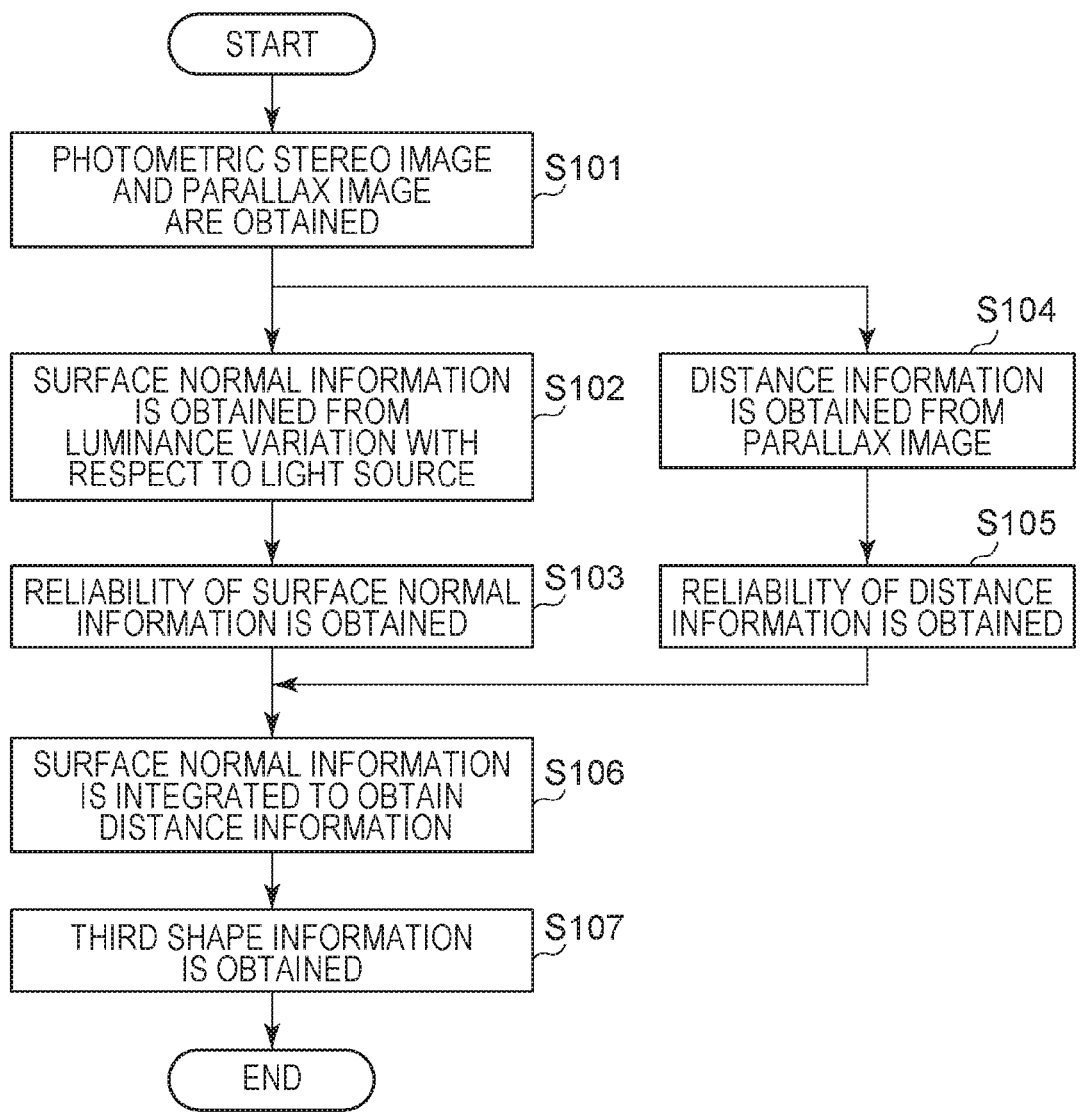
FIG. 4 is a flowchart illustrating image processing that is performed by an image processor of the imaging apparatus according to the embodiment.

FIG. 4 is a flowchart of a method of obtaining the shape information (method of processing an image) in the imaging apparatus 1000 according to the present embodiment. According to the present embodiment, the method of obtaining the shape information is performed in accordance with an image processing program that causes a computer to function as an image-processing apparatus by using the system controller 110 and the image processor 104. For example, the image processing program may be stored in a storage medium that can be read by the computer.

At a step S101, the system controller 110 obtains the imaging conditions (such as the stop value, the exposure time, or the focal length) that are set by the user from the information input unit 108. Subsequently, in conjunction with full-press operation of a release button (not illustrated), the object is imaged in the set imaging conditions with the light sources disposed at different positions to obtain the photometric stereo images and the parallax images. Specifically, the system controller 110 causes the light emitter 200 that is divided into eight sections to successively irradiate the object with light from at least three or more different positions by using the emission light source control unit 106 and causes the imager 100 to image the object by using the imaging control unit 107. The object is imaged also in a state in which no light is emitted to obtain the parallax images. The A/D converter 103 performs A/D conversion of an analog signal that is outputted from the imaging element 102 to form a shot image (luminance information) and outputs the image to the image processor 104. The image processor 104 may perform a typical developing process and various image correction processes to generate the image.

At a step S102, the first obtaining unit 104a presumes the first shape information (surface normal information) of the object by the photometric stereo method by using the luminance value of the photometric stereo images that are obtained at the step S101.

At a step S103, reliability of the surface normal information is obtained by referring a difference between the luminance of the imaged image and luminance on the presumption of the Lambertian reflection when the first obtaining unit 104a obtains the surface normal information. This step may be performed at the same time as the surface normal information is obtained at the step S102.

At a step S104, the second obtaining unit 104b obtains the parallax difference by a known method such as block matching by using the parallax images that are obtained at the step S101 and also obtains the distance information.

At a step S105, the second obtaining unit 104b obtains reliability of the distance information on the basis of similarity during block matching.

At a step S106, the third obtaining unit 104c calculates the distance information by integrating the surface normal information.

At a step S107, the third obtaining unit 104c combines the distance information that is obtained at the S106 and the distance information that is obtained at the step S104 to obtain precise distance information as the third shape information.

Specifically, the third obtaining unit 104c obtains the third shape information in the following manner. The distance information that is obtained at the S106 is based on the surface normal information, has high resolution, and enables fine irregularities of the object to be obtained. In some cases, however, a systematic error is made, for example, because variation in the amount of light from the light emitter causes an error of surface normal, and a sloping (mistaken) object surface is obtained. The distance information that is obtained at the S105 has low resolution and does not enable the fine irregularities to be obtained but enables the absolute distance to be obtained with precision. Accordingly, precise shape information can be obtained by correcting a linear slope such that the surface shape of the object that is calculated from the distance information that is obtained at the S106 matches the distance information that is obtained at the S105. Precise distance information (third shape information) can also be obtained in a manner in which a weighted average is applied on the basis of the reliability that is obtained at the steps S103 and S105 such that a weight increases as the reliability increases.

The image storage unit 109 saves the third shape information and the image information that are finally obtained, and the flow is finished.

The flow at the steps S102 and S103 and the flow at the steps S104 and S105 may be serial (whether which flow is earlier than the other is not limited) or parallel. At the step S106, the third obtaining unit 104c performs the conversion from the surface normal information (first shape information) into the distance information. However, the first obtaining unit 104a may performed the conversion. The reliability is not necessarily used at the step S107.

According to the present embodiment, precise shape information can be obtained with a simple structure as described above.

In an example described according to the present embodiment, the distance information is obtained as the third shape information. However, the surface normal information may be obtained by using the first shape information and the second shape information. In this case, specifically, the distance information that is obtained at the step S104 is differentiated and converted into the surface normal information instead of integrating the surface normal information by the third obtaining unit 104c at the step S106. At the step S107, the surface normal information that is obtained at the S102 and the surface normal information that is obtained at the S106 are combined to obtain precise surface normal information as the third shape information. When the surface normal information is combined, a weighted average may be applied on the basis of the reliability that is obtained at the steps S103 and S105 such that a weight increases as the reliability increases as with the combination of the distance information. For example, in the case where the presumed reflection properties differ from the actual reflection properties of the object, the reliability of the surface normal information that is obtained by the photometric stereo method decreases, and the weight of the surface normal information that is obtained from the parallax images increases. Consequently, more precise surface normal information can be obtained from the first shape information and the second shape information.

A structure according to the present embodiment will now be described.

The first shape information is the surface normal information of the object. The second shape information is the distance information of the object.

The surface normal information is calculated as the first shape information from the photometric stereo images, and the distance information is calculated as the second shape information from the parallax images. This enables advantages thereof can be complementary combined as above. Consequently, the third shape information can be obtained with precision.

According to the present embodiment, when the third shape information is obtained, first reliability information that represents the reliability of the first shape information is used.

The first reliability information may be information that represents whether presumed precision decreases when the photometric stereo method is used. Examples of the case where the presumed precision decreases when the photometric stereo method is used include the case where the photometric stereo images have a low luminance value, and a SN ratio is not good, the case where many images have an area that light does not strike and a shadow is created in the area, and the case where there is a large difference from luminance that is expected from Lambertian reflection properties. Examples of an indicator (magnitude) of the first reliability information may include the number of the photometric stereo images the luminance value of which exceeds a certain value and the sum total of the differences from the luminance that is expected from the Lambertian reflection properties between the photometric stereo images. In an object area that has low reliability of the first shape information, the third shape information can be obtained with precision by increasing contribution by the second shape information.

Similarly, according to the present embodiment, when the third shape information is obtained, second reliability information that represents the reliability of the second shape information is used.

The second reliability information may be information that represents whether the precision of calculation of the distance information from the parallax images decreases. Examples of the case where the precision of calculation of the distance information from the parallax images decreases include the case where the degree of similarity is low during matching between the parallax images, and the case where matching is difficult because the images on which matching is based have low contrast. Examples of an indicator (magnitude) of the second reliability information may include the similarity during matching and the contrast of the reference image. In an object area that has low reliability of the second shape information, the third shape information can be obtained with precision by increasing contribution by the first shape information.

The area of the pupil of the imaging optical system 101 through which light flux passes when each photometric stereo image is shot contains at least a part of the area through which light flux passes when at least one of the parallax images is shot.

In the case where the area of the pupil through which light flux passes when each photometric stereo image is shot has a common portion to the area of the pupil through which light flux passes when at least one of the parallax images is shot, the influence (decrease in the precision) of the optical aberration and the parallax difference when the third shape information is obtained can be reduced. For example, one of the parallax images is obtained by the G1 pixel in FIG. 10, and the photometric stereo image is obtained by the same G1 pixel as above. This enables the images to be obtained with the light flux that is related to the common pupil area. However, the size of the pupil varies depending on the stop value during imaging, and the common portion is not completely common (identical) when the stop value varies. It can be said that the photometric stereo image and the parallax image are obtained such that the area of the pupil has the common portion also in the case where the photometric stereo image is obtained as the sum of the G1 pixel and the G2 pixel (that is, an image that is related to the G1 pixel and an image that is related to the G2 pixel are added to obtain the photometric stereo image).

In addition, the area of the pupil of the imaging optical system 101 through which light flux passes when each photometric stereo image is shot is the same as the area through which light flux passes when at least one of the parallax images is shot. This enables the influence of the optical aberration and the parallax difference to be further reduced.

In the case where, regarding the area of the pupil through which light flux passes, one of the parallax images that has the common portion to the photometric stereo images is the reference image in the distance calculation, the influence of the optical aberration and the parallax difference between the first shape information and the second shape information can be reduced. For example, when the reference image is the parallax image that is related to the G1 pixel, the photometric stereo images may be obtained by only the G1 pixel or as the sum of the G1 pixel and the G2 pixel. In the above description, the pupil is divided into two sections. However, the same is true when the pupil is divided into three sections or more.

The area of the pupil of the imaging optical system 101 through which light flux passes when each photometric stereo image is shot contains at least a part of the area through which light flux passes when each image that is included in the parallax images is shot. That is, all of the areas of the pupil through which light flux passes when each parallax image is shot have the common portion to the area of the pupil through which light flux passes when the photometric stereo image is shot.

This enables the influence of the optical aberration and the parallax difference when the third shape information is obtained can be reduced. Consequently, the third shape information can be obtained with higher precision. For example, when the parallax images are the images that are related to the G1 pixels and the images that are related to the G2 pixels, it can be said that the photometric stereo images are obtained as the sum of the G1 pixels and the G2 pixels such that the areas of the pupil through which light flux passes when all of the photometric stereo images and all of the parallax images are shot have the common portion.

The photometric stereo images are obtained by adding all of the pixels that are related to the parallax images. The pixels that are related to the parallax images mean pixels are used to obtain the parallax images among the pixels that are included in each micro lens. For example, when two parallax images are obtained by the imaging element illustrated in FIG. 10 and FIG. 11, the G1 pixel is related to one of the two parallax images, and the pixel G2 is related to the other parallax image. That is, as illustrated in FIG. 10 and FIG. 11, the imaging element 102 includes the pixels in each micro lens, and all of the pixels that are included in the micro lens are used to obtain the photometric stereo images.

Use efficiency of light from the object can be improved in a manner in which the photometric stereo images are obtained by adding all of the pixels that are related to the parallax images. This is beneficial in the perspective of dynamic range and the SN ratio of the photometric stereo images. This enables the first shape information to be obtained with precision. Consequently, the third shape information can be obtained with precision.

In the case where the second obtaining unit 104b obtains the distance information as the second shape information, the photometric stereo images are obtained by the pixel that is related to the reference image of the parallax images on which the distance information is based.

This enables the influence of the optical aberration and the parallax difference between the first shape information and the second shape information to be reduced. Consequently, the third shape information can be obtained with precision.

When the parallax images are obtained (shot), in one embodiment, light is not emitted from the light emitter 200 or light is emitted from all of the light sources.

During matching of the parallax images in the distance calculation, the entire object is irradiated with light without nonuniformity. This facilitates matching and prevents the entire area of the object from being darkened, and the precision of the distance calculation is improved. When light is emitted from a part of the light emitter, the object is nonuniformly irradiated with the light and a dark area or shadow is created thereon. When the light is emitted from the entire light emitter, the object can be uniformly irradiated with the light. When ambient light is sufficiently bright for imaging, the object can be uniformly irradiated with the light when shot with only the ambient light.

The parallax images may be obtained by applying the weighted average on images that are included in the photometric stereo images in the light source conditions. Each image that is included in the photometric stereo images that are obtained by the imaging element according to the present embodiment as illustrated in FIG. 10 and FIG. 11 can be divided into the parallax images by extracting some of the pixels that are included in each micro lens. Accordingly, the images that are included in the photometric stereo images and that are related to the light source conditions can be divided into the parallax images. The weighted average may be applied to the parallax images that are thus obtained in the light source conditions. Images that are included in the photometric stereo images may be divided into the parallax images after the weighted average is applied.

In this case, the parallax images can be obtained at the same time as the photometric stereo images are shot. The application of the weighted average to the photometric stereo images enables the entire object in each parallax image to be bright without depending on the light source conditions.

The parallax images may be obtained by using one of the photometric stereo images.

The use of one of the photometric stereo images as the parallax images for the distance calculation eliminates the necessity of shooting the parallax images in the light source conditions that differ from those for the photometric stereo images and enables the number of the images that are needed to be decreased. In addition, the use of one of the photometric stereo images enables the number of the parallax images that are used for the distance calculation to be decreased and enables data capacity and calculation load to be reduced.

Exposure conditions in which the photometric stereo images are imaged differ from exposure conditions in which the parallax images are imaged.

In one embodiment, the exposure conditions mean setting conditions of the imaging apparatus such as a shutter speed, the stop value, and ISO sensitivity. The exposure conditions differ from the brightness of the light emitter and the ambient light. For the photometric stereo images, the stop value is increased to increase depth of field at which the first shape information can be obtained. For the parallax images, the depth of field is increased, and the stop value is decreased to a certain extent to improve the precision of the distance calculation. For this reason, the exposure conditions are changed when the photometric stereo images and the parallax images are imaged.

For the photometric stereo images, the amount of light from the light emitter can be increased by setting the exposure conditions to include a dark condition, and the precision of obtaining the first shape information based on variation in how the object is viewed depending on the light from the light emitter can be improved. Consequently, the precision of obtaining the third shape information can be improved.

At least one of the light sources of the light emitter 200 emits pattern light.

The use of the parallax images that are obtained by emitting the pattern light from at least one of the light sources of the light emitter improves the precision of matching in the distance calculation for the object that has low contrast. Accordingly, the precision of obtaining the second shape information can be improved. Consequently, the precision of obtaining the third shape information can be improved.

Other embodiments will now be described.

Figure 5:
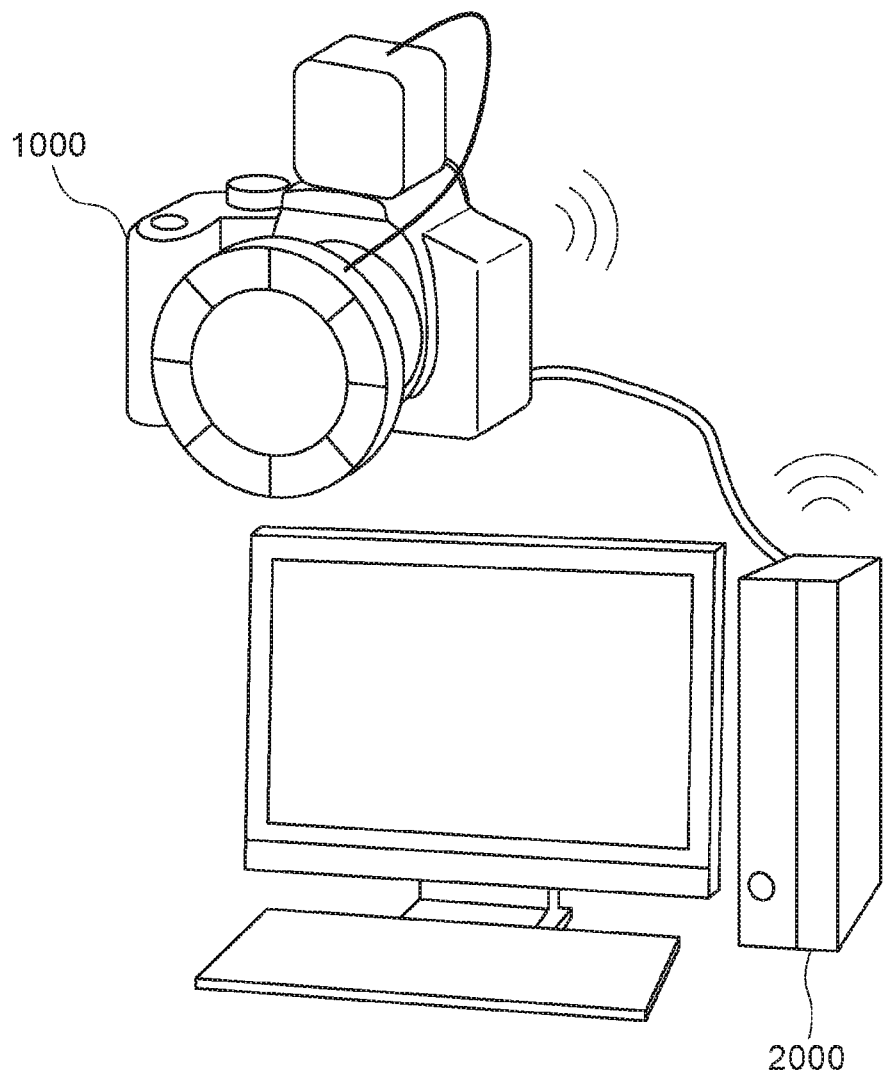
FIG. 5 illustrates an imaging apparatus and an image-processing apparatus according to another embodiment.
Figure 6:
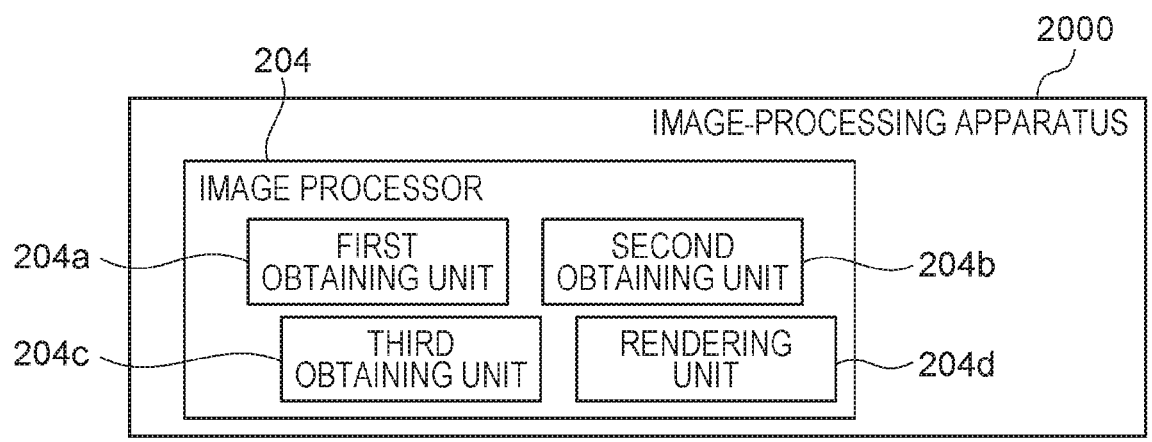
FIG. 6 is a block diagram of the image-processing apparatus according to the other embodiment.

According to the above embodiment, the image processor 104 of the imaging apparatus 1000 calculates the shape information of the object. However, the shape information of the object may be calculated by using an image-processing apparatus 2000 that differs from the imaging apparatus 1000. An example of the image-processing apparatus 2000 is a PC. FIG. 5 schematically illustrates the structure thereof. FIG. 6 illustrates a block diagram of the image-processing apparatus 2000.

The image-processing apparatus 2000 is connected to the imaging apparatus with a cable or wireless and can obtain the photometric stereo images and the parallax images that are obtained by the imaging apparatus through communication. The image-processing apparatus 2000 includes a first obtaining unit 204a, a second obtaining unit 204b, and a third obtaining unit 204c that correspond to the first obtaining unit 104a, the second obtaining unit 104b, the third obtaining unit 104c described above. The image-processing apparatus 2000 also includes a rendering unit 204d.

Figure 7:
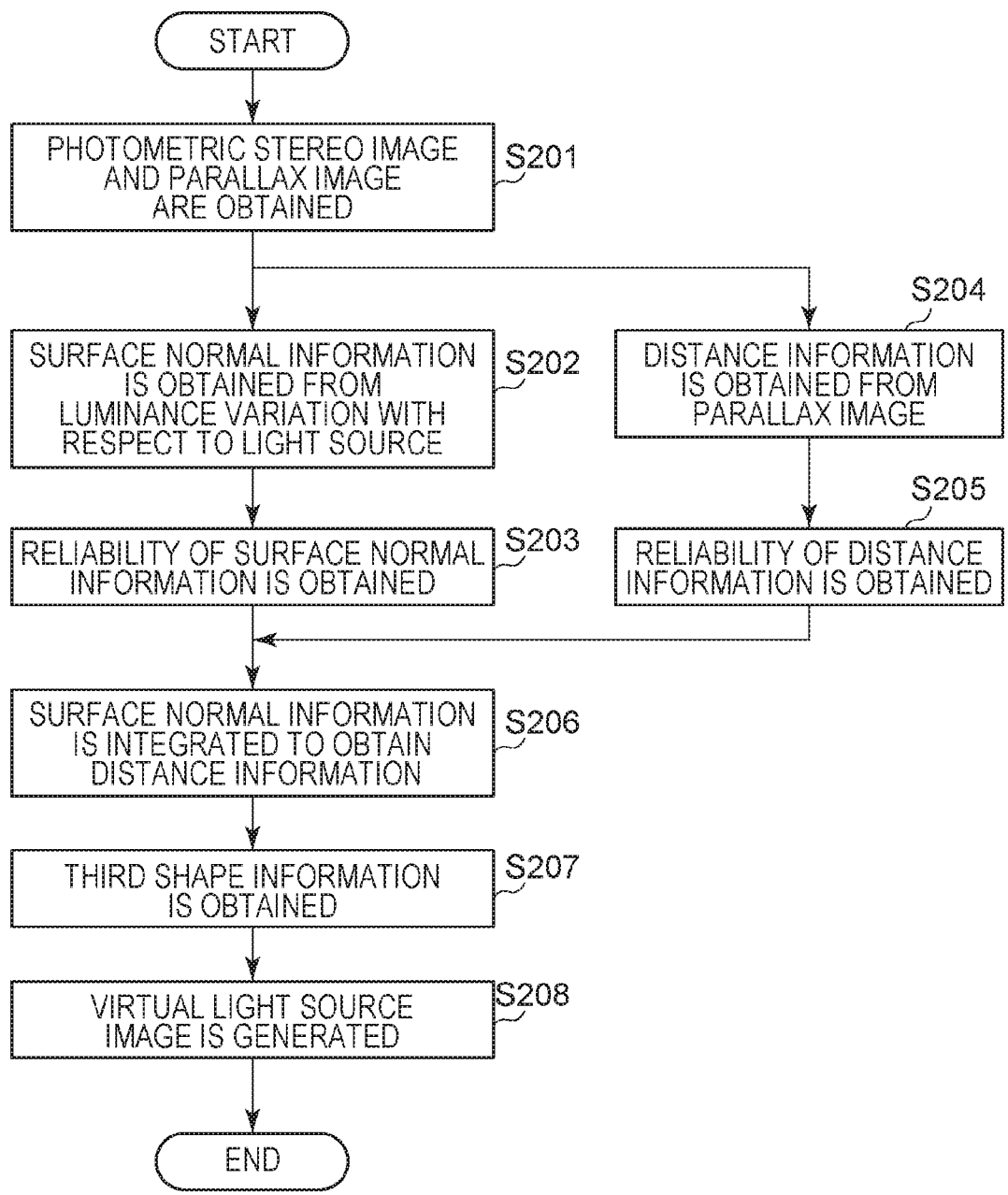
FIG. 7 is a flowchart illustrating image processing that is performed by the image-processing apparatus according to the other embodiment.

FIG. 7 is a flowchart illustrating a process of obtaining the shape information according to the present embodiment.

Steps S201 to S207 in FIG. 7 are the same as the steps S101 to S107 according to the above first embodiment, and a description thereof is omitted.

At a step S208, the rendering unit 204d generates a virtual light source image on the basis of the shape information that is obtained. Specifically, the use of the third shape information and the Lambertian diffuse reflectance that is calculated by the photometric stereo method enables a rendering process to generate an image in which the appearance of the object is reproduced on the basis of the positions of the light sources and the amount of light that are virtually set. The reason is that the appearance of the object is determined by, for example, the shape information of the object, information about the reflectance of the object, and information about the light sources. Since the distance information is obtained, a relationship between the front and rear of the object can be seen, and a shadow that is produced by shielding light from the light sources can be reproduced. The image storage unit saves a rendering image. The processes are finished.

The exemplary embodiments of the disclosure are described above. The disclosure, however, is not limited to the embodiments. Various combinations, modifications, and alterations can be made within the range of the sprit thereof.

According to the aspect of the embodiments, the image-processing apparatus can obtain precise shape information with a simple structure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. JP 2018-125527, filed Jun. 29, 2018, which is hereby incorporated by reference herein in its entirety.

What is claimed is:

1. An apparatus comprising:
an imaging element for obtaining a plurality of parallax images by receiving a plurality of light flux that passes through different areas of a pupil of an optical system by different pixels; and
a processor for performing image processing on an image that is obtained by using the imaging element,
wherein the processor includes:
a first obtaining unit that obtains first shape information of an object based on a plurality of photometric stereo images that are shot by using the imaging element in light source conditions that include at least three different light source conditions;
a second obtaining unit that obtains second shape information of the object by using the plurality of parallax images; and
a third obtaining unit that obtains third shape information of the object by using the first shape information and the second shape information, the third shape information being different from the first shape information and the second shape information.

2. The apparatus according to claim 1,
wherein the first shape information is surface normal information, and the second shape information is distance information.

3. The apparatus according to claim 1,
wherein an area of the pupil through which light flux passes when an image that is included in the plurality of photometric stereo images is shot contains at least a part of the area through which light flux passes when at least one of the plurality of parallax images is shot.

4. The apparatus according to claim 1,
wherein an area of the pupil through which light flux passes when each image that is included in the plurality of parallax images is shot has a common portion to an area through which light flux passes when an image that is included in the plurality of photometric stereo images is shot.

5. The apparatus according to claim 1,
wherein an image that is included in the plurality of photometric stereo images is obtained by adding all of the pixels that are related to the plurality of parallax images.

6. The apparatus according to claim 1,
wherein an area of the pupil through which light flux passes when an image that is included in the plurality of photometric stereo images is shot is the same as the area through which light flux passes when at least one of the plurality of parallax images is shot.

7. The apparatus according to claim 1,
wherein the second shape information is distance information, and
wherein each image that is included in the plurality of photometric stereo images is obtained by a pixel that is related to a reference image of the plurality of parallax images on which the distance information is based.

8. The apparatus according to claim 1,
wherein the light source conditions are conditions of combination of turning-on or turning-off of a plurality of light sources, and
wherein all of the plurality of light sources are turned off when the plurality of parallax images are shot.

9. The apparatus according to claim 1,
wherein the light source conditions are conditions of combination of turning-on or turning-off of a plurality of light sources, and
wherein all of the plurality of light sources are turned on when the plurality of parallax images are shot.

10. The apparatus according to claim 8,
wherein the apparatus includes a light emitter that includes the plurality of light sources.

11. The apparatus according to claim 1,
wherein the plurality of parallax images include an image that is obtained by applying a weighted average of images that are included in the plurality of photometric stereo images.

12. The apparatus according to claim 1,
wherein the plurality of parallax images include an image that is obtained by using one of the plurality of photometric stereo images.

13. The apparatus according to claim 1,
wherein an exposure condition when an image that is included in the plurality of photometric stereo images is shot differs from an exposure condition when the plurality of parallax images are shot.

14. The apparatus according to claim 1,
wherein the third shape information is surface normal information or distance information.

15. A method of processing an image, the method comprising:
obtaining first shape information based on a plurality of photometric stereo images that are shot in light source conditions that include at least three different light source conditions by using an imaging element for obtaining a plurality of parallax images by receiving a plurality of light flux that passes through different areas of a pupil of an optical system by different pixels;
obtaining second shape information by using the plurality of parallax images; and
obtaining third shape information by using the first shape information and the second shape information, the third shape information being different from the first shape information and the second shape.

16. The method according to claim 15,
wherein an area of the pupil through which light flux passes when an image that is included in the plurality of photometric stereo images is shot contains at least a part of the area through which light flux passes when at least one of the plurality of parallax images is shot.

17. The method according to claim 15,
wherein an area of the pupil through which light flux passes when each image that is included in the plurality of parallax images is shot has a common portion to an area through which light flux passes when an image that is included in the plurality of photometric stereo images is shot.

18. A non-transitory storage medium in which a program that causes a computer to perform a method comprising:
obtaining first shape information based on a plurality of photometric stereo images that are shot in light source conditions that include at least three different light source conditions by using an imaging element for obtaining a plurality of parallax images by receiving a plurality of light flux that passes through different areas of a pupil of an optical system by different pixels;
obtaining second shape information by using the plurality of parallax images; and
obtaining third shape information by using the first shape information and the second shape information, the third shape information being different from the first shape information and the second shape.

19. The non-transitory storage medium according to claim 18,
wherein an area of the pupil through which light flux passes when an image that is included in the plurality of photometric stereo images is shot contains at least a part of the area through which light flux passes when at least one of the plurality of parallax images is shot.

20. The non-transitory storage medium according to claim 18,
wherein an area of the pupil through which light flux passes when each image that is included in the plurality of parallax images is shot has a common portion to an area through which light flux passes when an image that is included in the plurality of photometric stereo images is shot.

* * * * *